(12) United States Patent
Deshpande et al.

(10) Patent No.: US 7,916,687 B2
(45) Date of Patent: Mar. 29, 2011

(54) STANDBY TIME IMPROVEMENTS

(75) Inventors: Manoj M. Deshpande, San Diego, CA (US); Arnaud Meylan, San Diego, CA (US); Ranjith Jayaram, San Diego, CA (US); Sanjiv Nanda, Ramona, CA (US)

(73) Assignee: Qualcomm Incorporated, San Diego, CA (US)

( * ) Notice: Subject to any disclaimer, the term of this patent is extended or adjusted under 35 U.S.C. 154(b) by 924 days.

(21) Appl. No.: 11/538,774

(22) Filed: Oct. 4, 2006

(65) Prior Publication Data

US 2007/0211745 A1 Sep. 13, 2007

Related U.S. Application Data

(60) Provisional application No. 60/779,235, filed on Mar. 3, 2006, provisional application No. 60/779,824, filed on Mar. 7, 2006, provisional application No. 60/795,846, filed on Apr. 27, 2006.

(51) Int. Cl.
*H04W 4/00* (2009.01)
(52) U.S. Cl. ......... 370/328; 370/432; 370/347; 370/478
(58) Field of Classification Search .................. None
See application file for complete search history.

(56) References Cited

U.S. PATENT DOCUMENTS

| | | | |
|---|---|---|---|
| 6,067,297 A | 5/2000 | Beach | |
| 6,212,175 B1 | 4/2001 | Harsch | |
| 6,504,819 B2 | 1/2003 | Fowler et al. | |
| 7,010,300 B1 | 3/2006 | Jones et al. | |
| 7,181,190 B2 | 2/2007 | Abhishek et al. | |
| 7,194,288 B2 | 3/2007 | Lee et al. | |
| 7,289,804 B2 | 10/2007 | Kim | |
| 7,440,781 B2 | 10/2008 | Beach et al. | |
| 7,505,795 B1 | 3/2009 | Lim et al. | |
| 7,515,569 B2 | 4/2009 | Prasad | |
| 7,593,417 B2 | 9/2009 | Wang et al. | |

(Continued)

FOREIGN PATENT DOCUMENTS

EP 1511335 A2 3/2005

(Continued)

OTHER PUBLICATIONS

Jing Al et al: "An adaptive coordinated medium access control for wireless sensor networks" Computers and Communications, 2004. Proceedings. ISCC 2004. Ninth International Symposium on Alexandria, Egypt Jun. 28-Jul. 1, 2004, Piscataway, NJ USA, IEEE, vol. 1, Jun. 28, 2004, pp. 214-219 ISBN: 0-7803-8623-X.
International Search Report—PCT/US07/063334—International Search Authority—European Patent Office—Jul. 9, 2007.
Written Opinion—PCT/US07/063334—International Search Authority—European Patent Office—Jul. 9, 2007.

(Continued)

*Primary Examiner* — Bob A Phunkulh
(74) *Attorney, Agent, or Firm* — Abodollah Katbab

(57) ABSTRACT

Broadcast or multicast traffic is classified into different types of traffic and different transmission schedules associated with each of the different types of traffic. The different types of broadcast and multicast traffic may be implemented in an 802.11-based system where an access point is configured to classify broadcast and multicast traffic into different types and assign different transmission schedules to each of the different traffic types. An associated wireless station may thereby wake from a power save mode only at intervals corresponding to delivery times of the types of traffic that the wireless station has elected to receive. In some aspects the different types of broadcast and multicast traffic may comprise user plane traffic and control plane traffic.

61 Claims, 9 Drawing Sheets

U.S. PATENT DOCUMENTS

| | | | |
|---|---|---|---|
| 2003/0093476 A1* | 5/2003 | Syed | 709/204 |
| 2003/0093530 A1* | 5/2003 | Syed | 709/226 |
| 2003/0112815 A1 | 6/2003 | Lee | |
| 2003/0137970 A1 | 7/2003 | Odman | |
| 2004/0013256 A1 | 1/2004 | Massoud | |
| 2004/0029586 A1 | 2/2004 | Laroia et al. | |
| 2004/0100973 A1 | 5/2004 | Prasad | |
| 2005/0085279 A1 | 4/2005 | Aoki | |
| 2005/0122936 A1 | 6/2005 | Son et al. | |
| 2005/0254444 A1* | 11/2005 | Meier et al. | 370/312 |
| 2005/0288022 A1 | 12/2005 | Ryu et al. | |
| 2006/0126533 A1* | 6/2006 | Wang | 370/254 |
| 2006/0140186 A1* | 6/2006 | LoGalbo et al. | 370/390 |
| 2006/0165031 A1* | 7/2006 | Wang et al. | 370/328 |
| 2007/0021155 A1 | 1/2007 | Yu et al. | |
| 2007/0127478 A1 | 6/2007 | Jokela et al. | |

FOREIGN PATENT DOCUMENTS

| | | |
|---|---|---|
| EP | 1592272 A2 | 11/2005 |
| WO | WO0060810 A1 | 10/2000 |
| WO | WO0163842 A1 | 8/2001 |
| WO | WO0169859 A1 | 9/2001 |
| WO | WO0237890 A2 | 5/2002 |
| WO | WO02078258 A2 | 10/2002 |
| WO | WO03025597 A1 | 3/2003 |
| WO | WO2005002137 A1 | 1/2005 |

OTHER PUBLICATIONS

International Preliminary Report on Patentability—PCT/US07/063334—The International Bureau of WIPO—Geneva, Switzerland—Sep. 18, 2008.

* cited by examiner

STANDBY TIME IMPROVEMENTS

CLAIM OF PRIORITY UNDER 35 U.S.C. §119

This application claims the benefit of and priority to U.S. Provisional Patent Application No. 60/779,235, filed Mar. 3, 2006, entitled "STANDBY TIME IMPROVEMENTS FOR WLAN," U.S. Provisional Patent Application No. 60/779,824, filed Mar. 7, 2006, entitled "STANDBY TIME IMPROVEMENTS FOR WLAN," and U.S. Provisional Patent Application No. 60/795,846, filed Apr. 27, 2006, entitled "STANDBY POWER MANAGEMENT," each of which is assigned to the assignee hereof, and the disclosure of each of which is hereby incorporated by reference herein.

BACKGROUND

1. Field

This application relates generally to communications, and more specifically, to classifying traffic into different types of traffic to increase standby time.

2. Background

An electronic device may support one or more communication protocols to transmit information to and receive information from other electronic devices. For example, a mobile device may support a wireless protocol such as IEEE 802.11 to communicate over airwaves with another device.

In wireless applications it is desirable to increase the amount of time a mobile device may be operated between battery recharges. In general, a mobile device operates in one of two states. Talk-time generally refers to the time the mobile device is actively engaged in sending or receiving user traffic such as when a call is in progress. Standby time generally refers to the time the mobile device is not in active communication but is not completely turned off. During standby time the mobile device may still transmit and receive certain types of traffic such as signaling. A conventional method of increasing operating time of a mobile device is to incorporate a relatively large battery into the mobile device. Unfortunately, this method may be both costly and inconvenient for a user of the mobile device.

A communication protocol such as those in the IEEE 802.11 family may support power savings in a wireless communication device by defining procedures that enable a mobile device to transition to a power save mode when it is not actively transmitting or receiving data. For example, an 802.11-based access point that provides frames to the mobile device may buffer the frames when the mobile device is in the power save mode. In addition, the 802.11 family of protocols defines procedures that enable the mobile device to, upon transitioning from the power save mode to a normal operating mode, access a communication channel to transmit and receive frames.

For downlink broadcast or multicast traffic, the access point will temporarily buffer the traffic in the event any mobile device in the access point's service set (e.g., the set of all 802.11-based stations associated to that access point) is in the power save mode. In this case, the access point will transmit the broadcast or multicast traffic to the mobile devices at predefined intervals. Thus, any mobile device in a power save mode may wake at the predefined intervals to receive the buffered broadcast or multicast traffic.

In some applications the user of a given mobile device may only wish to receive some of the broadcast or multicast traffic. However, in the conventional 802.11-based approach, the mobile device will be configured to wake from the power save mode at every designated interval to ensure that the user receives all of the broadcast or multicast traffic of interest. As a result, standby time of the mobile device may be reduced due to the need to awaken and receive what may often be unwanted traffic.

SUMMARY

A summary of selected aspects of the disclosure follows. For convenience, one or more aspects of the disclosure may be referred to simply as "an aspect" or "aspects."

In some aspects broadcast or multicast traffic is classified into different types of traffic. In addition, different transmission schedules may be associated with each of the different types of traffic. For example, one type of traffic may be transmitted at a first time interval while another type of traffic may be transmitted at a second time interval, where the second time interval is longer than the first time interval. In this way, a device that wishes to receive only a selected portion of the different types of traffic (e.g., the other type) only needs to wake from a power save mode at intervals associated with the selected type(s) of traffic. Here, the different types of broadcast or multicast traffic may consist of data sent in various forms including, for example, streaming data. For convenience these different types of data (e.g., different types of data streams) will be referred to herein simply as different types of "traffic."

In some aspects the different types of broadcast and multicast traffic may be implemented in an 802.11-based system. Here, an access point may be configured to filter received downlink broadcast and multicast traffic to categorize the traffic into different types. In addition, the access point may assign different transmission schedules to each of the different types such that the transmission schedules have different periodicities.

A wireless station may be adapted to receive the different types of broadcast or multicast traffic from the access point. For example, in some aspects the access point implements a known classification scheme that defines different types of traffic. In this case, a wireless station may be configured with this information (e.g., when it is placed in service or at some other time). A wireless station also may "learn" the different types of traffic. For example, a wireless station may associate with the access point to receive the different types of broadcast or multicast traffic supported by that access point. Here, the wireless station may send a query to the access point regarding availability of different types of broadcast or multicast traffic. In conjunction with this query, the wireless station may obtain information regarding different types of broadcast or multicast traffic that are supported by the access point and associated transmission schedules.

The wireless station may then elect to receive one or more of the types of traffic. For example, the wireless station may only wake from a power save mode at intervals corresponding to delivery times of the types of traffic that the wireless station has elected to receive.

In some aspects the different types of broadcast and multicast traffic may comprise user plane traffic and control plane traffic. For example, user plane traffic may include streaming data, audio, video, or some other similar traffic. In contrast, control plane traffic may relate to, for example, connectivity, topology, path discovery, address resolution protocol ("ARP"), dynamic host configuration protocol ("DHCP"), paging, or other similar operations. Here, the control plane traffic may be sent less frequently than the user plane traffic. Accordingly, a wireless station may elect to ignore the user plane traffic while still receiving control plane traffic. Advantageously, standby time of the wireless station may be improved because the wireless station need not awaken from a power save mode to receive the user plane traffic area, resulting in less frequent and shorter wake times.

The broadcast and multicast traffic may be classified based on various criteria. For example, in some aspects an access point may identify different types of traffic based on one or more of a protocol type, a source address, a destination address, a source port, a destination port, a type of service, a frequency of the traffic, an application associated with the traffic, or some other suitable criteria.

In some aspects a method of receiving broadcast or multicast traffic comprises receiving at least one of a plurality of different types of broadcast or multicast traffic, wherein different transmission schedules are associated with the different types of traffic.

In some aspects an apparatus comprises a receiver adapted to receive at least one of a plurality of different types of broadcast or multicast traffic, wherein different transmission schedules are associated with the different types of traffic, and a scheduler adapted to schedule reception of the at least one type of traffic in accordance with at least one associated transmission schedule.

In some aspects an apparatus comprises means for receiving at least one of a plurality of different types of broadcast or multicast traffic, wherein different transmission schedules are associated with the different types of traffic, and means for scheduling reception of the at least one type of traffic in accordance with at least one associated transmission schedule.

In some aspects a computer-readable medium including instructions stored thereon comprises a first instruction set for receiving at least one of a plurality of different types of broadcast or multicast traffic, wherein different transmission schedules are associated with the different types of traffic.

In some aspects a method of providing classified broadcast or multicast traffic comprises receiving broadcast or multicast traffic, classifying the received traffic into different types of traffic, and associating different transmission schedules with the different types of traffic.

In some aspects an apparatus comprises a receiver adapted to receive broadcast or multicast traffic, a classifier adapted to classify the received traffic into different types of traffic, and a scheduler adapted to associate different transmission schedules with the different types of traffic.

In some aspects an apparatus comprises means for receiving broadcast or multicast traffic, means for classifying the received traffic into different types of traffic, and means for associating different transmission schedules with the different types of traffic.

In some aspects a computer-readable medium including instructions stored thereon comprises a first instruction set for receiving broadcast or multicast traffic, a second instruction set for classifying the received traffic into different types of traffic, and a third instruction set for associating different transmission schedules with the different types of traffic.

BRIEF DESCRIPTION OF THE DRAWINGS

These and other features, aspects and advantages of the disclosure will be more fully understood when considered with respect to the following detailed description, appended claims and accompanying drawings, wherein:

FIG. 2, including

Figure 1:
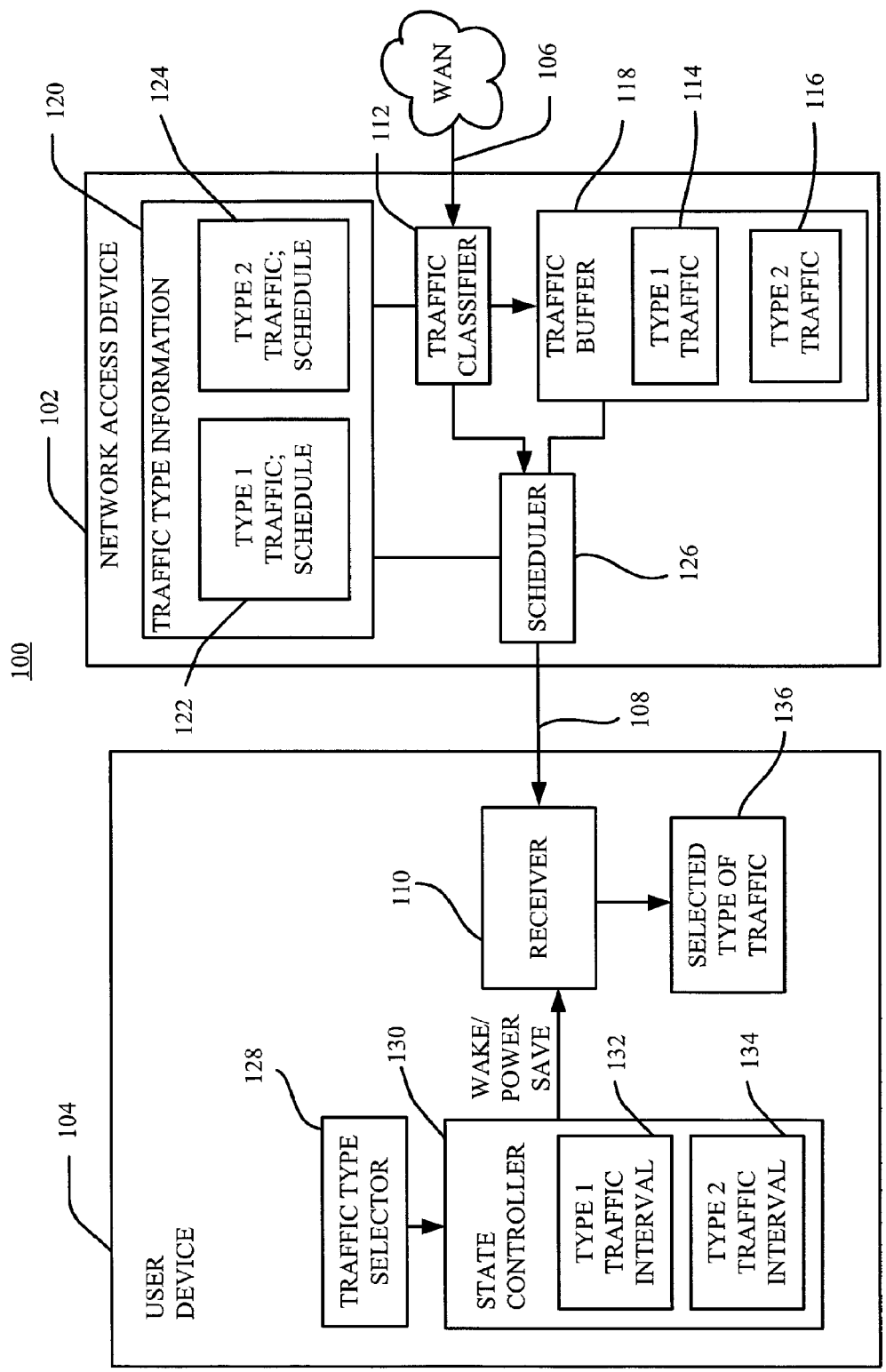
FIG. 1 is a simplified block diagram of several exemplary aspects of a communication system utilizing broadcast or multicast traffic classified into different types of traffic.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein.

FIG. 1 illustrates certain aspects of a system 100 where broadcast or multicast traffic is classified into different types of traffic. The system 100 includes a network access device 102 that communicates with one or more associated user devices (e.g., access terminals). For convenience, various aspects of a user device will be discussed with reference to a user device 104. Traffic (e.g., data in the form of frames, packets, etc.) destined for the user device 104 is routed through the access device 102. For example, the access device 102 may receive traffic from a wide area network ("WAN") via a link 106. Alternatively, the access device 102 may receive traffic destined for the user device 104 from another user device or some other device (not shown). The access device 102 then forwards the traffic to the user device via a link 108. A user device may also be referred to as a user equipment (UE), an access terminal, a station (STA), a wireless communication device, a terminal, a user terminal, a mobile equipment, a subscriber unit, or some other terminology. A user device may be a cellular phone, a smart phone, a cordless phone, a laptop computer, a PDA, a wireless device, a wireless modem, a mobile device, a handset, a handheld device, a satellite radio, a global positioning system, or some other communication device.

To conserve power, and thereby increase the standby time of the user device 104, the user device 104 may transition to a power save mode when it is not sending or receiving traffic. For example, at least a portion of the components of the user device 104 may be switched to a suspended state or powered down at this time. In a typical application, lower layer components such as a receiver 110 (e.g., a radio component) may be switched to a suspended state to conserve power.

The user device 104 occasionally wakes from the power save mode to send or receive traffic. For example, the access device 102 may buffer broadcast or multicast traffic destined for the user devices when any of the user devices (e.g., user device 104) is in a power save mode. In addition, the access device 102 may be configured to send the buffered traffic to the user devices at defined intervals. In this case, each user device is configured to wake from its power save mode at the defined intervals to receive the traffic.

In some applications a given user device may only need to receive a portion of the broadcast or multicast traffic. For example, the broadcast or multicast traffic may include control plane traffic (e.g., ARP traffic or other management-related traffic), user plane traffic (e.g., streaming audio or video) and, perhaps, some other type of traffic. In some instances, however, the user device may have no interest in receiving the user plane traffic. For example, the user may not have a subscription to receive a broadcast or multicast from a given access point. As another example, the user may not want to watch the current video streaming. Accordingly, provisions may be made to enable the user device to remain in a power save mode when the access device 104 transmits the user plane traffic or some other unwanted traffic.

In some aspects the access device 102 may classify traffic destined for the user devices into different traffic types. Here, the access device 102 defines two or more traffic types such that when the access device 102 receives a given instance of traffic, the access device 102 classifies that traffic as one of the defined traffic types. In addition, the access device 102 may transmit the different traffic types at different times. Consequently, in the event the user device 104 does not wish to receive one or more of the different types of traffic, the user device 104 may elect to remain in a power save mode when the access device 102 transmits the unwanted types of traffic.

Figure 2A:
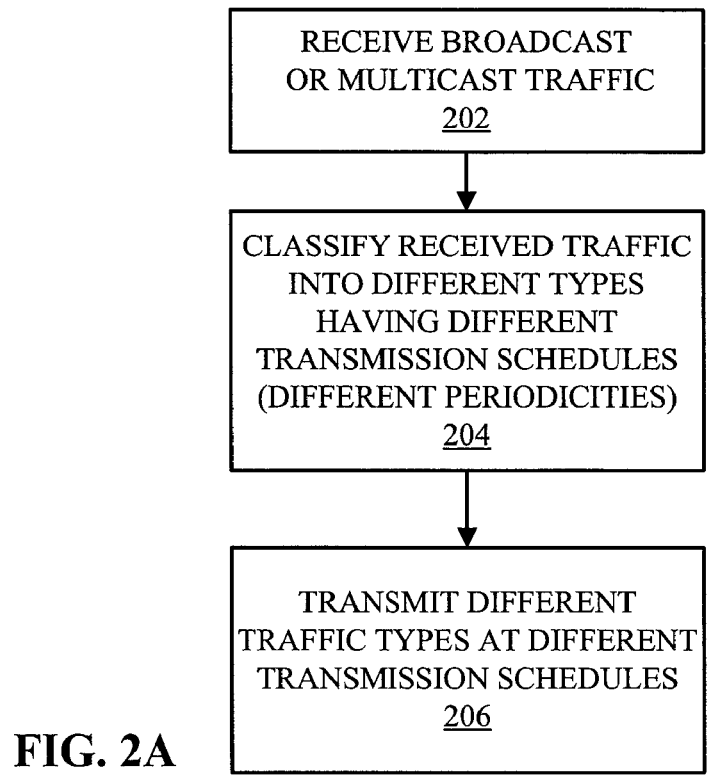
FIGS. 2A and 2B, is a flowchart of several exemplary aspects of operations that may be performed in conjunction with broadcast or multicast traffic classified into different types of traffic.
Figure 2B:
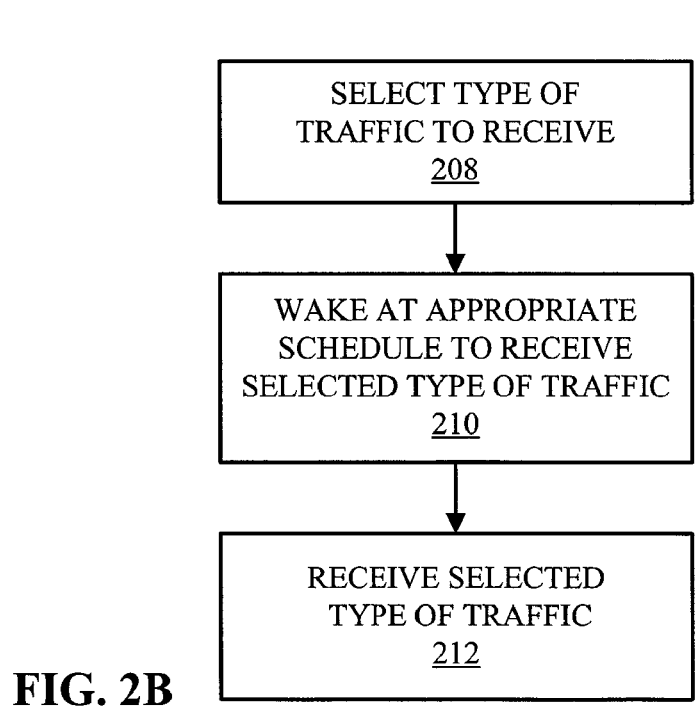

These and other aspects of the disclosure will be discussed in more detail in conjunction with the flowchart of FIG. 2 and with further reference to FIG. 1. FIG. 2A relates to operations that may be performed to classify broadcast or multicast traffic into different traffic types. FIG. 2B relates to operations that may be performed to selectively receive one or more of the different types of broadcast or multicast traffic. For convenience, the operations of FIG. 2 (and any other flowchart herein) may be described in conjunction with specific components. It should be appreciated, however, that these operations may be performed in conjunction with and/or using other components.

Initially, as represented by block 202 in FIG. 2A, broadcast or multicast traffic is received from a source such as, for example, another communication device. In the example of FIG. 1, the access device 104 may receive broadcast or multicast traffic from the WAN via the link 106 or from some other source (not shown).

As represented by block 204, the received broadcast or multicast traffic is classified accordingly to the supported traffic types. For example, in FIG. 1 a traffic classifier 112 may classify received traffic as one of two types of traffic. The traffic classifier 112 and/or an associated component then stores the received traffic (designated as one of two traffic types 114 and 116) in a traffic buffer 118 when one or more user devices is in a power save mode.

The different types of traffic may be associated with different transmission schedules. For example, a first type of traffic may be scheduled to be transmitted at a given interval having a given periodicity. A second type of traffic may be scheduled to be transmitted at a different interval having a different periodicity. As illustrated in FIG. 1, the access device 102 may maintain traffic type and associated transmission schedule information 120 for each traffic type 122 and 124.

As represented by block 206, each traffic type may thus be transmitted to the user devices (or other devices) in accordance with the associated transmission schedule. For example, in FIG. 1 a scheduler 126 may initiate transmission of the buffered type 1 traffic 114 at intervals defined by the schedule information 122. Similarly, the scheduler 126 may initiate transmission of the buffered type 2 traffic 116 at intervals defined by the schedule information 124.

Referring now to FIG. 2B, as represented by block 208 a device that may be configured to receive the traffic transmitted at block 206 may elect to receive one or more of the different types of traffic. In FIG. 1, a traffic type selector 128 may, under manual or automatic control, determine the types of traffic that are to be received by the user device 104. Thus, the traffic type selector 128 may elect to only receive, for example, traffic type 2.

As mentioned above, to conserve power a device may enter a power save mode (or some other similar mode or state) when it is not transmitting or receiving traffic. To this end, the user device 104 includes a state controller 130 for controlling an operating state of one or more components. For example, the state controller 130 may switch the receiver 110 between a wake mode (e.g., a normal, active state), a power save mode (e.g., a suspended or sleep state) or some other mode.

As represented by block 210, a device may transition from a power save mode to a wake mode at appropriate times to receive the selected type of traffic. Here, the appropriate wake times for a given traffic type may be derived from corresponding parameters 132 and 134 stored in the user device 104. As an example, in the event the selector 128 selected type 2 traffic, the state controller 130 may cause the receiver 110 to transition to the wake mode at time intervals defined by the type 2 traffic interval 134.

As represented by block 212, the device is thus able to receive the selected type of traffic. As shown in FIG. 1, the receiver 110 may be activated to receive traffic over the link 108 to obtain only a selected type of traffic 136. Once this traffic has been received the user device 104 may return to the power save mode. Advantageously, the user device 104 need not wake to receive the type 1 traffic. Accordingly, the standby time of the user device 104 may be improved because it may remain in a power save mode for a longer period of time as opposed to a more conventional approach where the user device 104 may wake to check for and/or analyze all broadcast or multicast traffic transmitted by the access device 102.

An apparatus or method involving the classification of broadcast or multicast traffic into different types of traffic may be implemented in a variety of ways. For convenience, additional details will now be described in the context of an 802.11-based system. It should be appreciated, however, that the teachings herein are not limited to this type of system or to the components and operations specifically set forth herein.

In an 802.11-based system, the access device 102 of FIG. 1 may comprise an access point and the user device 104 may comprise a wireless station. Each of these components will be discussed in more detail in conjunction with FIGS. 3 and 4.

Figure 3:
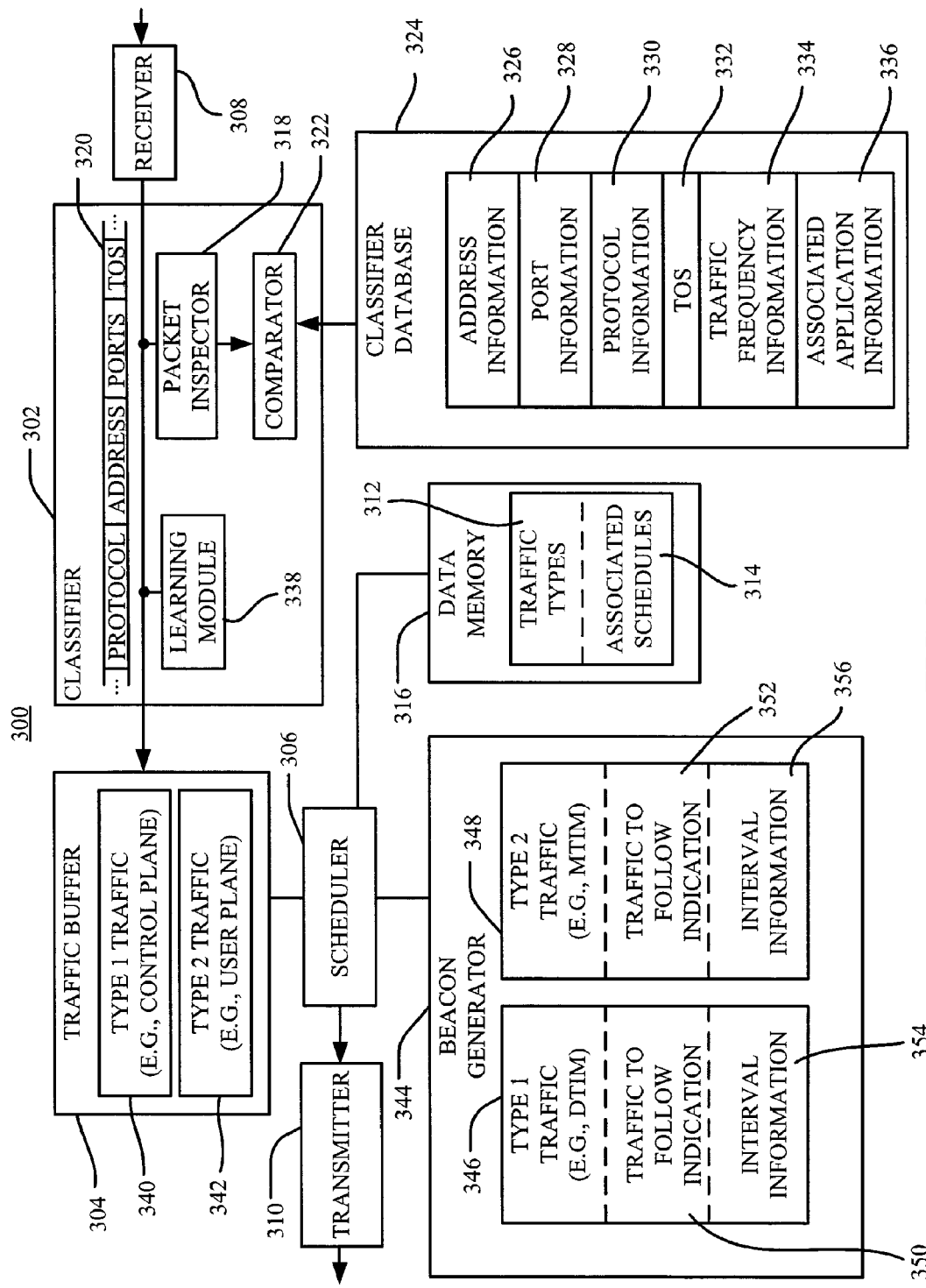
FIG. 3 is a simplified block diagram of several exemplary aspects of an access point.

FIG. 3 illustrates several aspects of an access point 300. Access point 300 includes a classifier 302, a traffic buffer 304 and a scheduler 306 and other components that may be similar to corresponding components in FIG. 1. Briefly, the access point 300 includes a receiver 308 (upper right portion of FIG. 3) that receives downlink traffic from, for example, a network. The classifier 302 classifies the received traffic into different types of traffic associated with different transmission schedules. When any of the stations in the access point's service set are in a power save mode, the access point 300 stores the classified traffic in the traffic buffer 304. Then, based on the respective transmission schedules, the scheduler 306 cooperates with a transmitter 310 to transmit the different types of traffic to the stations in the service set.

Figure 4:
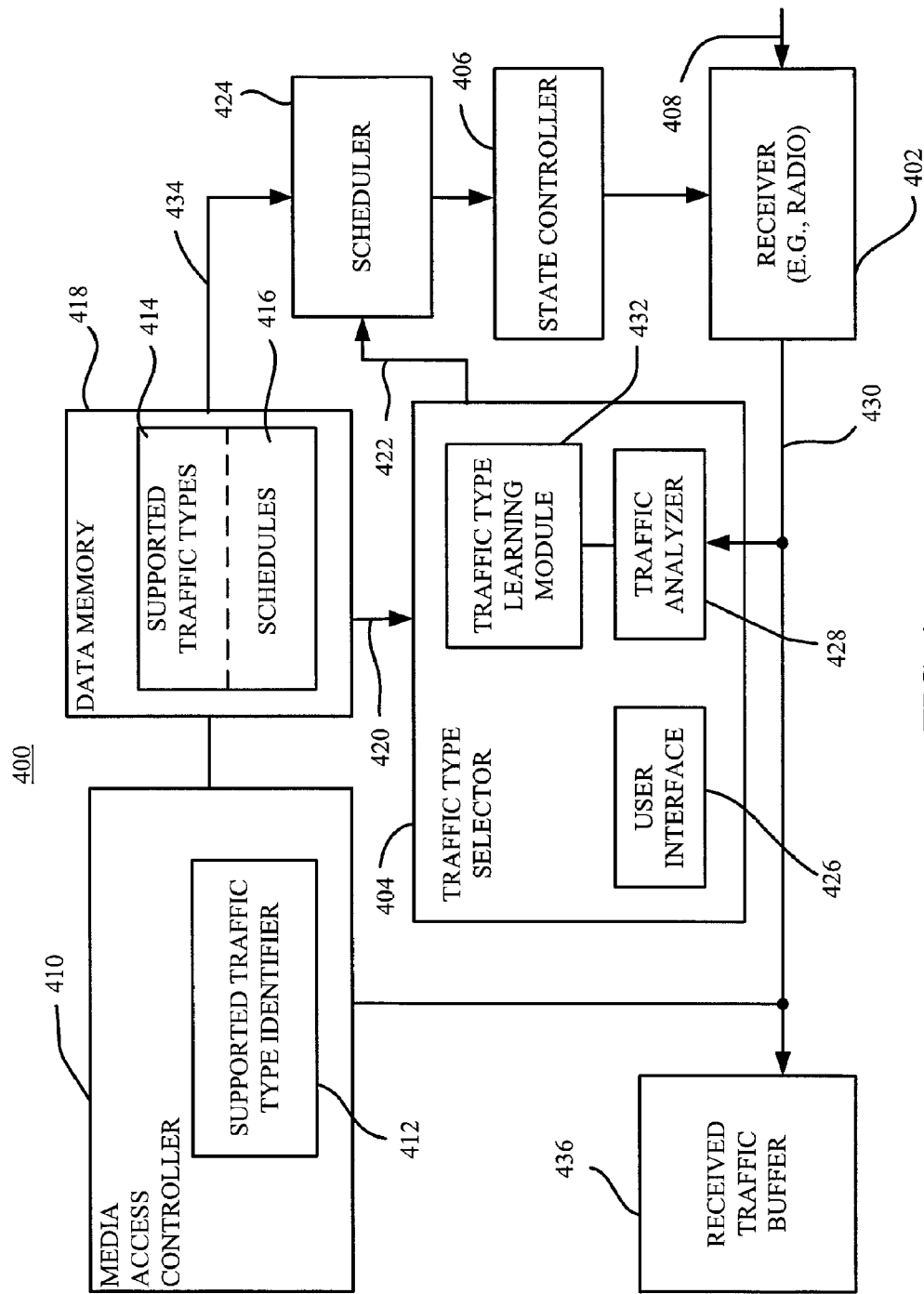
FIG. 4 is a simplified block diagram of several exemplary aspects of a wireless station.

FIG. 4 illustrates several aspects of a wireless station 400. The station 400 includes a receiver 402, a traffic type selector 404, and a state controller 406 and other components that may be similar to corresponding components in FIG. 1. The receiver 402 (lower right portion of FIG. 4) is adapted to receive the traffic transmitted by the transmitter 310 over an 802.11-based channel as represented by a line 408. Based on a selection made by the selector 404, the state controller 406 may cause the receiver 402 to wake from a power save mode at appropriate intervals to receive a selected type of traffic.

Figure 5:
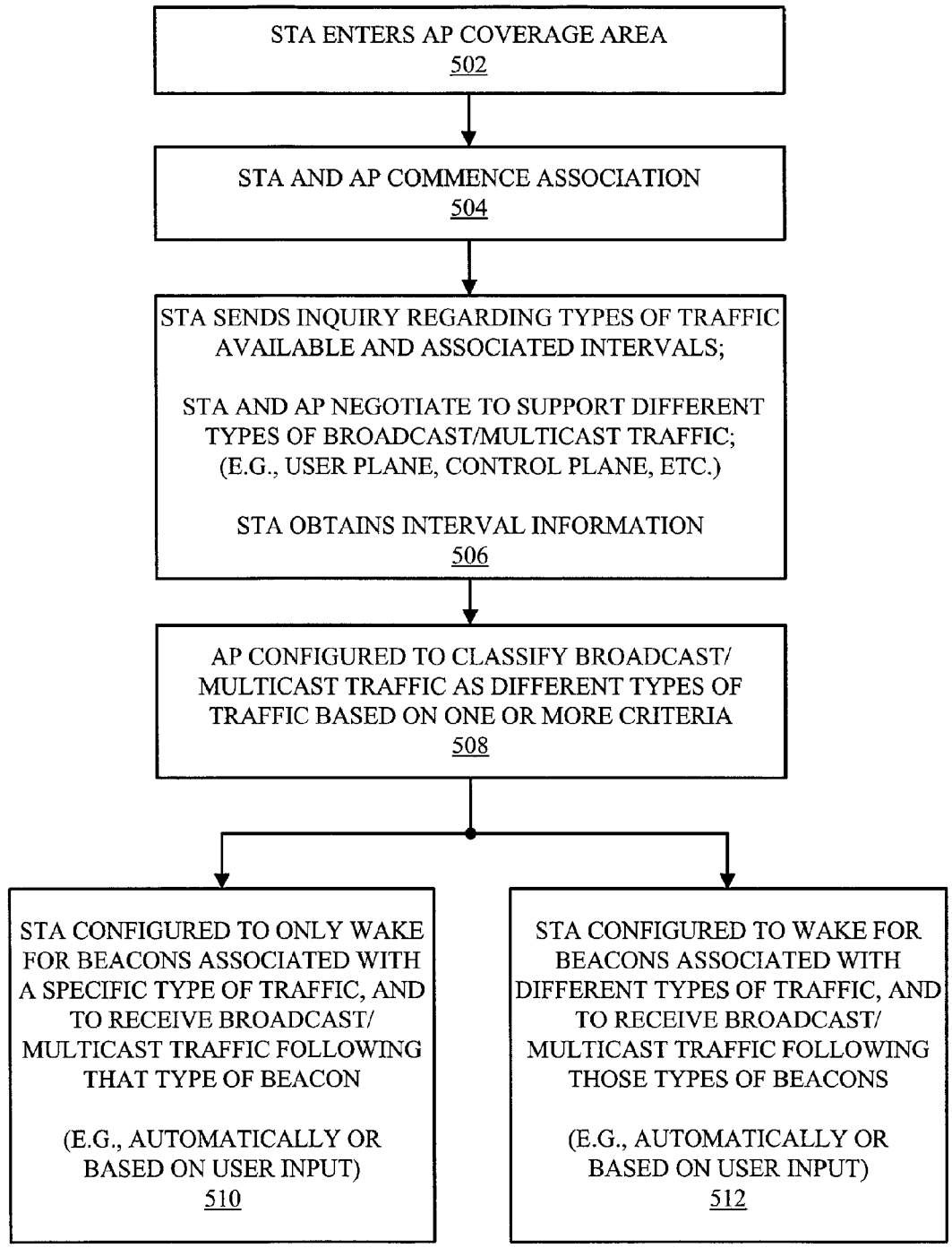
FIG. 5 is a flowchart of several exemplary aspects of operations that may be performed to configure a communication system.
Figure 6:
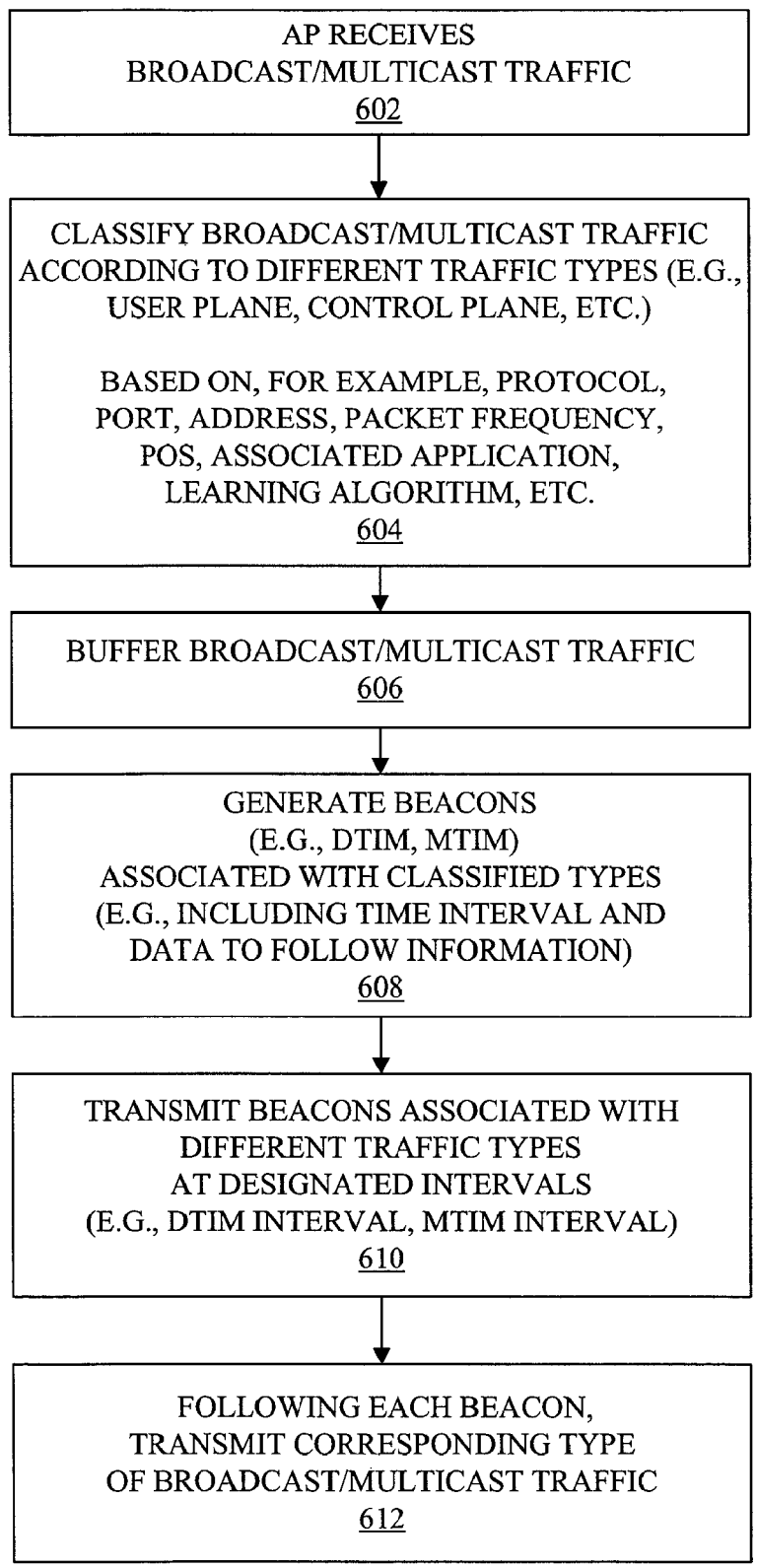
FIG. 6 is a flowchart of several exemplary aspects of operations that may be performed by an access point.
Figure 7:
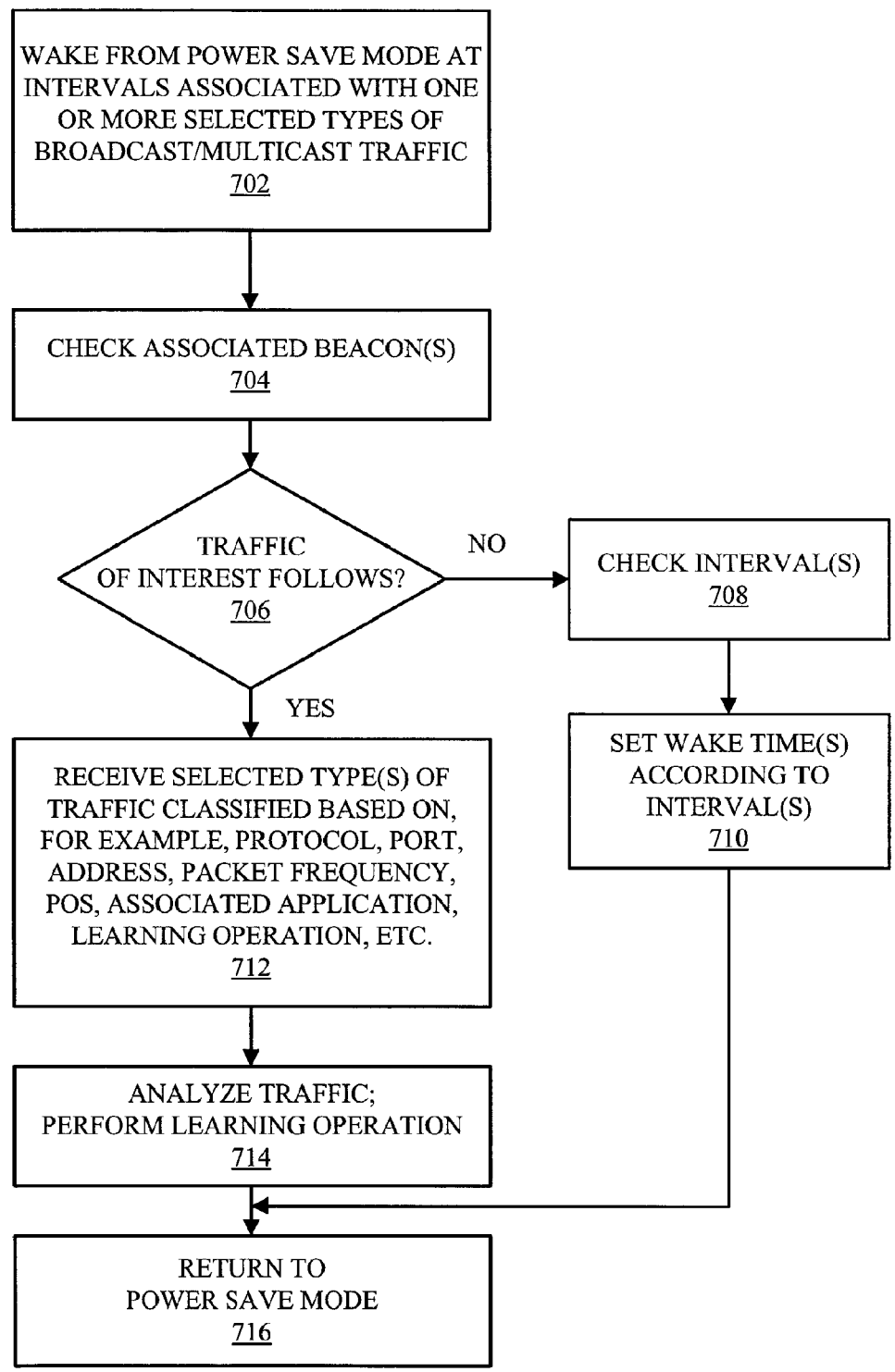
FIG. 7 is a flowchart of several exemplary aspects of operations that may be performed by a wireless station.
Figure 8:
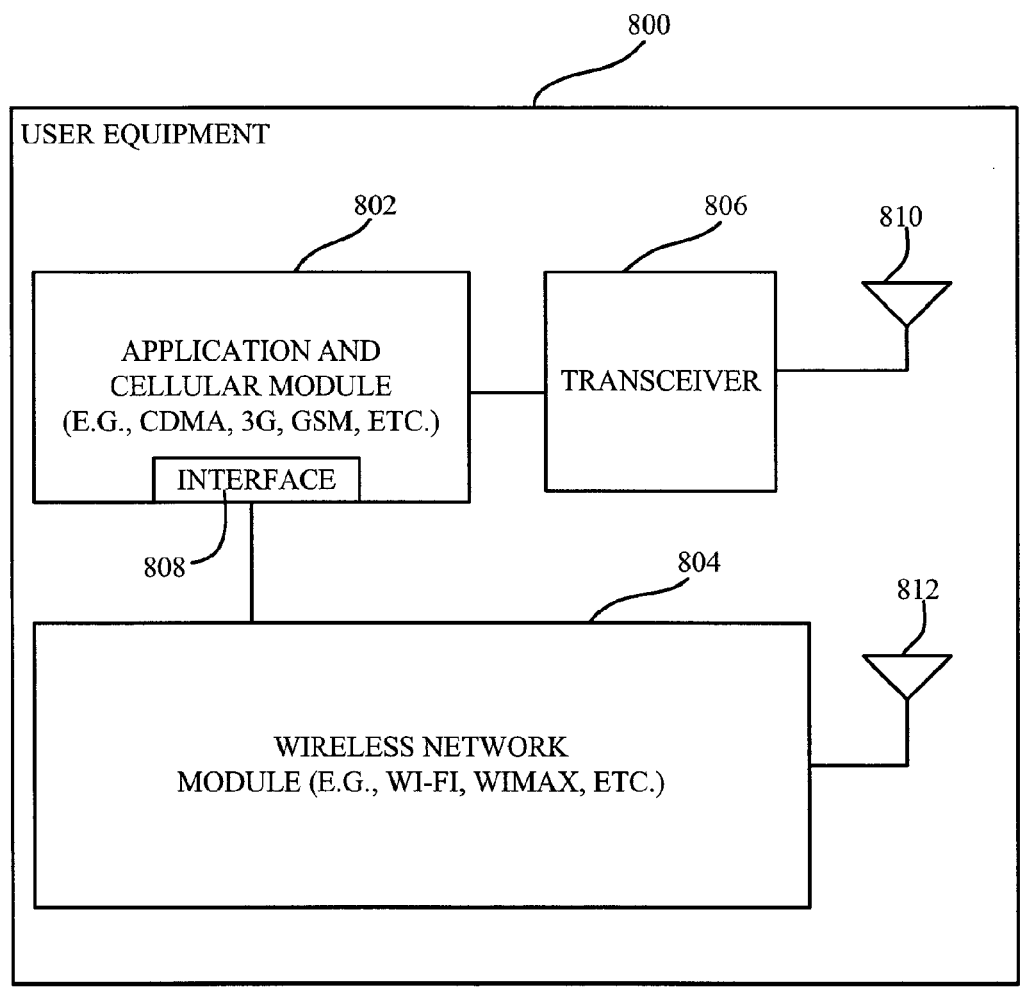
FIG. 8 is a simplified block diagram of several exemplary aspects of a communication system supporting multiple wireless protocols.

These and other exemplary operations will be discussed in more detail in conjunction with the flowcharts of FIGS. 5, 6, 7 and 8. FIG. 5 relates to various aspects of operations that may be performed to configure an access point and associated stations. FIG. 6 relates to various aspects of operations that may be performed by an access point. FIG. 7 relates to various aspects of operations that may be performed by a station to receive a specific type of traffic. FIG. 8 relates to various aspects of operations that may be performed by a station to receive different types of traffic.

Referring to FIG. 5, as represented by block 502, when a wireless station ("STA") enters a coverage area of an access point ("AP") the station and the access point may commence an association procedure (block 504). For example, the components may negotiate to communicate in a certain way and/or to support various functionalities. To this end, the station 400 of FIG. 4 may incorporate a media access controller 410 that is adapted to communicate with the access point 300 of FIG. 3 to establish communications over an 802.11-based channel. To reduce the complexity of FIGS. 3 and 4, other components that may be involved in this and other conventional operations are not depicted.

As represented by block 506, in conjunction with the association procedure or at some other time, the station may optionally inform the access point that the station is interested in receiving broadcast or multicast traffic that has been classified into different types. In the example of FIGS. 3 and 4, a supported traffic type identifier component 412 in the station 400 may send a query to the access point 300 to determine whether the access point 300 supports classified traffic.

As represented by block 508, the access point may have been configured to, based on one or more criteria as discussed in more detail below, classify broadcast or multicast traffic into different types of traffic. In the event the access point 300 supports such classified traffic, the access point 300 may maintain information relating to supported traffic types 312 and associated transmission schedules (e.g., time interval information) 314 in a data memory 316. In some implementations, the access point 300 may be statically configured by a system administrator to classify traffic according to the site's requirements.

In some cases, the station 400 (e.g., the identifier 412) and the access point 300 may negotiate to use different types of traffic and associated transmission schedules. Through such negotiation, the station (e.g., the identifier 412) may obtain the traffic type and transmission schedule information from the access point 300 and save corresponding entries relating to the supported traffic types 414 and the associated schedules 416 in a data memory 418.

As an alternative to the example of block 506, the station 400 may be configured in some other manner with information regarding the different traffic types. For example, the access point 300 may implement a known classification scheme that defines different types of traffic. In this case, the station 400 may be configured with this classification scheme when the station 400 is placed in service or at some other time. Alternatively, the station 400 may be configured to "learn" this classification scheme.

Traffic may be classified into a variety of different types depending upon the requirements of a given system. For example, as mentioned above in some aspects one type of broadcast or multicast traffic may be defined as user plane traffic. Such traffic may comprise, for example, traffic associated with a user application such as streaming data, audio or video. Such traffic may originate from, for example, a television or radio broadcast, a server, or some other source. The user plane traffic may thus include traffic associated with the content being delivered and/or traffic associated with operations that may be involved in the delivery of the content.

Another type of broadcast or multicast traffic may be defined as control plane traffic. Such traffic may comprise, for example, traffic associated with one or more of operating, managing or accessing a station. Typically, this type of traffic may take the form of network broadcast traffic. In some aspects control plane traffic comprises traffic associated with one or more of the station's connectivity, topology, path discovery, address resolution protocol ("ARP"), dynamic host configuration protocol ("DHCP"), presence or paging. An example of presence relates to providing a list of available contacts in an instant messenger application.

It should be appreciated based on the teachings herein that traffic may be classified into a variety of types including and/or other than the traffic types specifically set forth here. For example, some stations may only be interested in receiving certain types of content. Accordingly, traffic may be classified based on the particular content of the broadcast or multicast traffic. Similarly, some stations may only be interested in receiving certain types of management traffic. In this case, traffic may be classified based on different types of management traffic that may be sent to the stations via the broadcast or multicast traffic.

Moreover, depending upon the requirements of a given system, traffic may be classified into any number of types. That is, traffic may be classified into 2, 3, or more different types.

Also, a variety of transmission schedules may be associated with each type of traffic. Typically, different transmission schedules may be associated with each type. However, in some cases it may be desirable to assign the same transmission schedule to two or more types.

These transmission schedules may be defined in a variety of ways. For example, in some cases a transmission schedule may define a time interval at which a given type of traffic is repeatedly transmitted. Alternatively, a transmission schedule may define a more random schedule of times at which a given type of traffic is transmitted.

Preferably, each transmission schedule is a multiple of one of the transmission schedules such that some of the transmissions of different traffic types will coincide. For example, a first time interval may be associated with traffic that the access point transmits most frequently. Any other time interval supported by the access point may then be a multiple of the first time interval. For example, a second time interval may be twice as long as the first time interval while a third time interval may be three times as long as the first time interval. In addition, the second and third time intervals may be defined such that they coincide with the first time interval. In this way, a legacy station that does not support different traffic types at different transmission schedules may, by setting its static wake interval to the first time interval, receive all of the broadcast or multicast traffic buffered and transmitted by the access point.

The transmission schedule of a given type of traffic may depend on the transmission characteristics of the traffic. For example, the access point may receive some types of traffic more frequently than other types of traffic. In addition, the access point may receive some types of traffic at relatively regular intervals and receive other types of traffic on a more irregular basis. Streaming traffic (e.g., an audio or a video broadcast) is a typical example of the former type of traffic. In some applications, this type of traffic may be streamed at intervals on the order of 100 ms or less. Management traffic is a typical example of the latter type of traffic. This type of traffic is typically bursty in nature and generally involves the transfer of, on average, a smaller quantity of information. Accordingly, an access point may assign a relatively short time interval to traffic that is received relatively frequently and/or involves large transfers of data over time. Conversely the access point may assign a longer time interval to traffic that is received less frequently and/or involves smaller transfers of data over time.

Referring again to FIG. 5, as represented by blocks 510 and 512, once the station receives the classified traffic information the station may elect to receive one or more of the supported traffic types. For example, as represented by a line 420 in FIG. 4, the traffic type selector 404 may access the supported traffic type information 414. The traffic type selector 404 may then select one or more of the supported traffic types 414 and, as represented by a line 422, send this selection information to a scheduler component 424.

The traffic type selector 404 may make a selection automatically, based on user input or in some other suitable manner. For example, the station 400 may include a user interface 426 that is adapted to receive input from a user so that the user may select the types of traffic to be received by the station 400.

Alternatively, the selector 404 may incorporate a learning mechanism that enables the selector 404 to automatically select a traffic type. For example, the selector 404 may include a traffic analyzer 428 that analyzes received traffic on a link 430. The traffic analyzer 428 may thereby collect information to be used by a traffic type learning module 432 to determine which types of traffic are to be selected. As an example, the traffic on the link 430 may indicate that the station has entered the coverage area of the known access point. Based on prior learning (e.g., manual or automatic), learning module 432 may have an indication that certain types of traffic provided by that access point are unwanted. Accordingly, the selector 404 may elect to receive only some of the types of traffic from that access point (i.e., not the unwanted types of traffic).

As will be discussed in more detail below, traffic delivery may be associated with the transmission of beacons by the access point. For example, in accordance with traditional 802.11-based operations, the access point may send beacons at regular intervals whereby each beacon may indicate whether broadcast or multicast traffic will follow the beacon.

To support different types of traffic as taught herein, a given beacon may include information relating to one or more of the different traffic types. Such information may include, for example, an indication of the type of beacon and whether any traffic of the type associated with that type of beacon will be transmitted following the beacon.

Thus, in some aspects the access point may transmit a specific type of beacon associated with a specific type of traffic at intervals corresponding to the transmission schedule of that traffic type. In this case, a station may wake at appropriate intervals to receive the beacon to determine whether the access point will transmit the corresponding type of traffic following the beacon.

Block 510 in FIG. 5 relates to a case where the selector 404 selects a single type of traffic. In this case, the station 400 may be configured to only wake to receive the beacons associated with that specific type of traffic.

Block 512 in FIG. 5 relates to a case where the selector 404 selects more than one type of traffic. In this case, the station 400 may be configured to wake to receive each of the beacons associated with each of the selected types of traffic.

Referring now to FIG. 6, selected operations that may be performed by an access point to classify traffic will be discussed in more detail. As represented by block 602, the access point receives broadcast or multicast traffic via, for example, a network. In the example of FIG. 3, the receiver 308 receives this downlink traffic and provides the traffic to the classifier 302.

As represented by block 604, the classifier 302 analyzes the received traffic and classifies the traffic as one of the supported traffic types. As discussed above, received traffic may be classified as user plane traffic, as control plane traffic, or as some other suitable type of traffic.

The classifier 302 may classify traffic based on one or more criteria. For example, in some aspects traffic may be classified based on the content of the traffic. In this case, the classifier 302 may include a packet inspector 318 that analyzes the contents of packets in the traffic. The packet inspector 318 may obtain information such as protocol information, address information, port information and type of service information from a received packet 320. A comparator 322 may then compare the packet information with information stored in a classifier database 324. Based on this comparison, the classifier 302 may classify the received traffic (packet). In practice, the classifier 302 may use a given item of information from the classifier database 324 independently or in conjunction with other information (e.g., from the classifier database 324) to make a final determination as to the traffic type. Several examples of information that may be stored in the classifier database 324 follow.

The classifier database 324 may contain address information 326 that serves to identify a particular type of traffic. For example, a given source address and/or a given destination address may be associated with a particular type of traffic (e.g., streaming content, management, etc.). Advantageously, the address information may be used in applications where the received traffic is encrypted. That is, in general, address information will not be encrypted when other information in a packet (e.g., port information and content) is encrypted.

The classifier database 324 may contain port information 328 that serves to identify a particular type of traffic. For example, a given source port and/or a given destination port may be associated with a particular type of traffic (e.g., streaming content, management, etc.).

The classifier database 324 may contain protocol information 330 that serves to identify a particular type of traffic. For example, the user datagram protocol ("UDP") and/or the real-time protocol ("RTP") may be used to send streaming traffic. Accordingly, when received traffic supports a specified protocol 330, the classifier 302 may classify this traffic as a specific type of traffic (e.g., user plane). As discussed above, the classifier 302 may use this information in conjunction with other information to make a final determination as to the traffic type.

The classifier database 324 may contain type of service ("TOS") information that serves to identify a particular type of traffic. Here, particular settings of the TOS bits in a packet may be used to identify a particular type of traffic.

Alternatively, traffic may be classified based on other characteristics of the traffic. In some aspects, the classifier 302 may maintain a record of the frequency at which a particular type of traffic has been received. In this case, traffic frequency information 334 may be associated with specific types of traffic. For example, content related traffic may be received relatively frequently while management or control traffic may be received relatively infrequently. Again, the classifier 302 may use the frequency information 334 in conjunction with other information to make a final determination as to the traffic type. For example, the frequency information may be collected along with address or port information to determine the frequency of a specific flow of traffic.

In some aspects, the classifier 302 may determine and/or maintain a record 336 relating to one or more applications that are associated with the traffic. Here, a particular application may be associated with a specific type or types of traffic.

The criteria used for the classification operation may be obtained in a variety of ways. For example, information may be manually entered into the classifier database 324 based on known relationships between the information and specific types of traffic. Conversely, a learning module 338 may be used to dynamically categorize various criteria associated with specific types of traffic. Here, the learning module 338 may analyze received traffic and based on, for example, information relating to prior classifications, the learning module may generate criteria that may be used to classify current or future traffic.

Referring again to FIG. 6, in the event any of the stations in the access point's service set are in a power save mode, the access point may buffer the downlink broadcast or multicast traffic (block 606). In example of FIG. 3, the traffic is stored in the traffic buffer 304. Here, different types of traffic 340 and 342 may be stored in the traffic buffer 304 in a manner that enables all of the traffic of a given type to be readily retrieved from the traffic buffer 304.

In some aspects, a station may send a message to the access point indicating that the station is going into a power save mode and that the station will only wake for certain traffic types. The access point may advantageously use this information to elect not to buffer certain types of traffic when the station is in a power save mode. For example, if all of the stations in the access point's service set that are in a power save mode have elected to ignore a certain type of traffic, the access point may elect to immediately forward the broadcast/multicast the traffic as it is received. In this case, system performance may be improved due to elimination of delays that would otherwise be imparted by buffering the traffic.

In cases where the traffic is buffered, as represented by block 608 the access point generates beacons corresponding to each of the supported traffic types. As discussed above, a beacon may include information identifying the type of beacon and indicating whether the access point will transmit traffic of a particular type immediately following the beacon.

In the example where the classified types comprise user plane traffic and control plane traffic, the user plane traffic may be associated with a conventional delivery traffic indication map ("DTIM") beacon. Thus, the DTIM beacon may provide an indication as to whether user plane traffic will follow the DTIM beacon.

In accordance with conventional practice, the DTIM beacon may be generated at a time interval that is a multiple of the time interval (e.g., 100 ms) of a standard 802.11-based beacon that includes a traffic indication map ("TIM"). Depending upon how the access point is configured, the DTIM interval may be the same as or a multiple of the beacon interval.

In addition, a new form of beacon referred to as a management traffic indication map ("MTIM") beacon may be associated with the control plane traffic. The MTIM beacon may thus be used to provide an indication as to whether control plane traffic will follow the MTIM beacon.

The MTIM beacon may be generated at a time interval that is a multiple of the beacon interval and/or the DTIM interval. In addition, the MTIM interval may be the same as or longer than the beacon interval and/or the DTIM interval. Typically, the MTIM interval will be longer than the DTIM interval so that a standby time gain may be achieved by a station that elects to receive control plane traffic but not user plane traffic.

In some aspects, an access point may support a dynamic method of providing transmission schedule information to the stations. For example, each beacon transmitted by the access point may include information specifying the time interval for each type of beacon (e.g., TIM, DTIM, MTIM, etc.). In addition, each beacon may include a count specifying the number of beacons (e.g., regular beacons) that will be transmitted before the transmission of the next beacon of a specific type (e.g., DTIM, MTIM, etc.). For example, when the corresponding count reaches zero, this serves as an indication that the current beacon is a DTIM beacon and/or an MTIM beacon. In this way, a station that is only interested in a specific type of beacon (e.g., MTIM) may elect to remain in a power save mode until the access point transmits that type of beacon.

Referring to the example of FIG. 3, a beacon generator 344 may generate maps 346 and 348 corresponding to each beacon type. As discussed above, the maps 346 and 348 may include an indication 350 and 352 that the corresponding type of traffic will follow the beacon and information 354 and 356 relating to the interval for that beacon or some other beacon.

Referring again to FIG. 6, the access point may thus transmit the various types of beacons at the designated intervals (block 610) followed by the corresponding type of traffic (block 612). Referring to FIG. 3, the scheduler 306 may cooperate with the transmitter 310 to send the beacons and the traffic at the appropriate intervals. For example, the scheduler 306 may retrieve the schedule information 314 to determine when to send specific types of beacons. The scheduler 306 may then retrieve the corresponding beacon information (e.g., beacon map 346 or 348) and provide this information to the transmitter 310 for transmission at the appropriate interval. Similarly, the scheduler 306 may retrieve the appropriate type of traffic (e.g., traffic 340 or 342) and provide this information to the transmitter 310 for transmission following the corresponding beacon.

Referring now to FIG. 7, selected operations that may be performed by a station to receive classified traffic will now be treated. FIG. 7 describes operations that may be performed by a station to receive a specific type of traffic or different types of traffic. In other words, in the example of FIG. 4, FIG. 7 relates to a case where the selector 404 selects one or more of the supported traffic types 414 and sends an indication or indication of the selection(s) to the scheduler 424.

As represented by block 702 in FIG. 7, the station wakes from the power save mode at appropriate time intervals to receive the desired type(s) of broadcast or multicast traffic. For example, the scheduler 424 may retrieve the schedule information 416 (via a line 434) corresponding to the selected traffic type(s) as provided by the selector 404 via line 422. The scheduler 424 may then cooperate with the state controller 406 to transition the receiver 402 from a power save mode to an active mode such that the receiver 402 will receive the corresponding beacon for each traffic type that is transmitted by the access point. As discussed above, for example, when the selector 404 has selected to only receive control plane traffic, the state controller 406 may awaken the receiver 402 at appropriate intervals to receive the MTIM beacons, but not the DTIM beacons.

Alternatively, when the selector 404 has elected to receive several types of traffic, the state controller 406 may wake the receiver 402 at appropriate intervals to receive the different types of beacons associated with each traffic type. For example, the beacons may comprise MTIM beacons, DTIM beacons, beacons associated with traffic containing a specific type of content, etc. Depending on the attributes of these beacons, the receiver may be awakened to receive the beacons at different times or at the same time.

As represented by block 704, as each beacon is received the station checks the contents of the beacon. As discussed above, the beacon may include an indication that a specific type of traffic will follow the beacon (block 706).

In the event one or more of the beacons does not include an entry indicating that traffic of interest follows the beacon, the station may check the time interval information from each of those beacons (block 708) to determine when the traffic of interest may be delivered. In this case, as discussed above, the scheduler 424 may set the wake time(s) based on the corresponding time interval information (block 710). Thus, the state controller 406 may transition the receiver 402 back to the power save mode such that the receiver 402 remains in the power save mode until the designated wake time(s).

In contrast, in the event one or more of the beacons includes an entry at block 706 indicating that traffic of interest will follow the beacon, the operation proceeds to block 712. The station 400 may then receive the desired type(s) of broadcast or multicast traffic and store the traffic in a received traffic buffer 436. As discussed above, the received traffic may have been classified based on one or more of a protocol, a port, an address, packet frequency, TOS, associated application, a learning operation, or some other criterion.

In addition, as discussed above the station 400 may analyze the traffic and perform a learning operation, if applicable (block 714). The state controller 406 maintains the receiver 402 in an active mode until all of the traffic following each beacon has been received. Once all the traffic has been received (and transmitted in cases where there is traffic to be transmitted), the state controller 406 transitions the receiver 402 back to the power save mode (block 716).

In view of the above, it may be appreciated that various advantages may be achieved in accordance with the teachings herein. For example, the standby time of a wireless local area network ("WLAN") device such as a phone may be increased by classifying broadcast and multicast traffic and negotiating longer sleep periods (thereby lowering the wake frequency of the WLAN device). Here, the network may buffer traffic for the mobile device and deliver the traffic synchronously to the mobile device.

The teachings herein are applicable to a variety of protocols, user devices and associated network components. Accordingly, a user device may incorporate various components to obtain connectivity to a network via various wireless platforms such as Wi-Fi (802.11-based), WiMAX or any other suitable wireless platform. In addition, it should be appreciated that various forms of traffic may be classified into two or more different types of traffic in accordance with the teachings herein. Moreover, this may be accomplished through the use of various architectures, protocols, specifications, or standards in addition to or other than those that have been specifically described.

In some embodiments, the teachings herein may be incorporated into a user device that supports multiple communication protocols. For example, a mobile device may be implemented as a multifunctional device providing, for example, email, Internet access, as well as traditional cellular communication. Such a device may be equipped with wide area wireless connectivity, for example, utilizing the following technologies: third generation wireless or cellular systems (3G), WiMAX (e.g., 802.16), or other Wireless Wide Area Network (WWAN) technologies. In addition as discussed above, a device may incorporate IEEE 802.11-based Wireless Local Area Network (WLAN) connectivity. Furthermore, a device may incorporate ultra-wideband (UWB) and/or Bluetooth-based Wireless Personal Area Network (WPAN) local connectivity.

In general, WWAN technologies are distinguished by wide area (ubiquitous) coverage and wide area deployments. However, they can suffer from building penetration losses, coverage holes and comparatively, to WLAN and WPAN, limited bandwidth. WLAN and WPAN technologies deliver very high data rates, approaching hundreds of Mbps, but coverage is typically limited to hundreds of feet in the case of WLAN and tens of feet in the case of WPAN.

A variety of networks and protocols have been defined in an attempt to provide appropriate functionality to meet the various demands of users and applications. Such disparate networks and protocols may be laborious for a user to switch between and, in many cases, the user is trapped in a network without regard to what might be the optimal network for the user at a given time. Accordingly, in some aspects a user device may be adapted to provide seamless transitions between networks and/or protocols for optimizing and converging on the best communication protocol for a user.

Referring again to FIG. 1, the system 100 may incorporate a WLAN associated with a wired local area network (LAN). As discussed above, the network access device 104 may comprise an access point that may be in communication with one or more user devices 102 (e.g., 802.11 mobile stations) configured to support WLAN connectivity. The access point may connect via a wired interface (e.g., link 106) to an Ethernet hub or switch for the wired LAN (not shown). The Ethernet hub also may be connected to one or more electronic devices (not shown) that may include personal computers, peripheral devices (e.g., facsimile machines, copiers, printers, scanners, etc.), servers, and the like. The Ethernet hub also may be connected to a router that transmits data packets to a modem (not shown). The modem may transmit data packets to a wide area network (WAN), such as the Internet. The system 100 illustrates a single, relatively simple network configuration. It should be appreciated, however, that many additional configurations of the system 100, including alternative user devices, are possible. Although the system 100 has been illustrated and described with reference to a LAN, it is possible that the system 100 may utilize other technologies including WWAN and/or WPAN either separately or concurrently.

The system 100 may enable a mobile device (e.g., user device 102) to seamlessly switch between an access point currently being utilized by the mobile device to the access point 104 associated with the system 100. A transfer to the access point 104 and to the network supported by the access point 104 may be desirable to provide the user of the mobile device a sought after functionality. Such a transfer may thus be a function of the location of the mobile device and/or the data the user desires to access or upload to the mobile device. By way of example and not limitation, the mobile device may be coupled to one or more of the electronic devices connected to the Ethernet hub to utilize the WWAN and/or WLAN functionality available through the electronic device(s). Such a transition can be user initiated or performed autonomously by the system 100.

Referring now to FIG. 8 various aspects of user equipment 800 (e.g., a mobile user device) that supports multiple communication protocols will be discussed in more detail. The user equipment 800, also called a mobile station, may in some aspects support WWAN such as Code-Division Multiple Access ("CDMA") and/or 3G technologies such as Wideband Code-Division Multiple Access ("WCDMA"). The user equipment 800 also may support WLAN (e.g., IEEE 802.11) and/or other suitable technologies.

In some aspects, the user equipment 800 may incorporate an application and cellular module 802 and a wireless network module 804. The module 802 may incorporate, for example, user applications and user interface components. In addition, the module 802 may support communication via, for example, a cellular-type technology such as CDMA, GSM, 3G or some other technology. The module 802 may interface with a transceiver 806 coupled to one or more antennas 810 to transmit information to and receive information from a corresponding wide area wireless network. The module 802 also may include an interface 808 for communicating with the wireless network module 804. The interface 808 may comprise, for example, a Secure Digital Input Output ("SDIO") interface or some other suitable interface.

As discussed herein, the wireless network module 804 may support, for example, communications via various networks. Such networks may support, for example, Wi-Fi, WiMAX or any other suitable technology. The network module 804 may incorporate an appropriate transceiver and be coupled to one or more antennas 812. Alternatively, the transceiver 806 may incorporate sufficient functionality such that the transceiver 806 is shared by the module 802 and the module 804.

In the configuration shown in FIG. 8, the module 802 may provide upper layer operations for the module 804. For example, applications that generate uplink packets and process downlink packets may be incorporated in the module 802. In this case, the entire module 804 (e.g., a WLAN module incorporating MAC and PHY components) may be placed in a suspended state (e.g., power save mode) to conserve power as discussed herein.

In some aspects, user equipment may provide VoIP phone functionality. In general, VoIP includes the transmission of voice telephone conversation through the Internet and/or through IP networks. In some aspects VoIP connectivity may be provided via a WLAN component. Here, a user may utilize the VoIP capabilities of the user equipment 800 when he/she is in the vicinity of a wireless access point connected to a broadband network that provides VoIP services. In other situations, the user equipment 800 may function as a regular wireless mobile phone while providing communication services.

The user equipment 800 may connect to either the WWAN or the WLAN, or to both simultaneously, based upon one or more criteria that relates to functions of the user equipment 800. Further, process and criteria for switching between each of the networks and/or protocols may also be provided. The criteria may be stored in a data memory (not shown in FIG. 8) of the user equipment 800 and a processor (not shown in FIG. 8) may analyze a network based on the stored criteria.

It should be appreciated based on the teachings herein that user equipment may be implemented in various ways. For example, in some implementations a WWAN functionality component and/or a WLAN functionality component may be included in a processor of the user equipment 800. In some implementations the WWAN functionality and the WLAN functionality may be provided by distinct integrated circuits. In other implementations the WWAN functionality and WLAN functionality may be provided by one or more integrated circuits, processors, ASICs, FPGAs, combinations thereof, or the like including appropriate functionality. The user equipment 800 thus may be equipped with connectivity options for wide area (WWAN) and local area (WLAN and WPAN) to allow a rich combination of services and user experiences.

Figure 9:
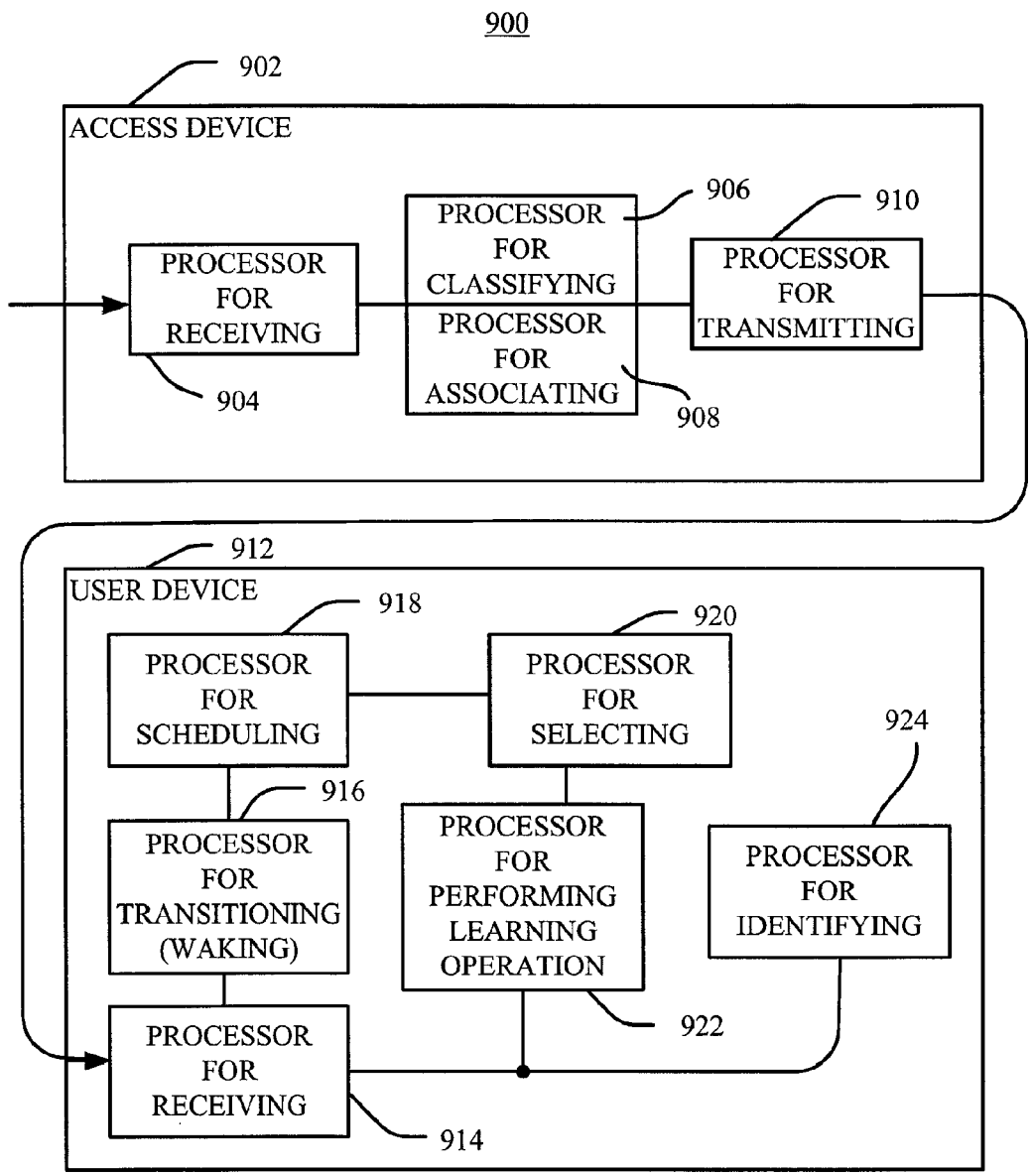
FIG. 9 is a simplified block diagram of several exemplary aspects of a communication system utilizing broadcast or multicast traffic classified into different types of traffic.

Similarly, the components described herein may be implemented in a variety of ways. For example, referring to the system 900 of FIG. 9, an access device 902 includes components 904, 906, 908, and 910 that may respectively correspond to components 308, 302, 306 and 310 of access point 300 in FIG. 3. In addition, a user device 912 includes components 914, 916, 918, 920, 922, and 924 that may respectively correspond to components 402, 406, 424, 404, 432 and 412 of station 400 in FIG. 4. FIG. 9 illustrates that in some aspects these components may be implemented via appropriate processor components. These processor components may in some aspects be implemented, at least in part, using structure as taught herein.

In addition, the components and functions represented by FIG. 9, as well as other components and functions described herein, may be implemented using any suitable means. Such means also may be implemented, at least in part, using corresponding structure as taught herein. For example, in some aspects a means for transmitting may comprise a transmitter, a means for receiving may comprise a receiver, a means for scheduling may comprise a scheduler, a means for selecting may comprise a selector, a means for classifying may comprise a classifier, a means for associating may comprise a scheduler, a means for transitioning may comprise a state controller, a means for waking may comprise a state controller, a means for identifying may comprise an identifier, and a means for performing learning operations may comprise a learning module. One or more of such means also may be implemented in accordance with one or more of the processor components of FIG. 9.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware, various forms of program or design code incorporating instructions (referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium (e.g., computer-readable medium) known in the art. An exemplary storage medium may be coupled to a machine such as, for example, a computer/processor (referred to herein, for convenience, as a "processor") such the processor can read information (e.g., software instructions) from, and write information to, the storage medium. An exemplary storage medium may be integral to the processor. The processor and the storage medium may reside in an ASIC. The ASIC may reside in user equipment. In the alternative, the processor and the storage medium may reside as discrete components in user equipment.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method of receiving broadcast or multicast traffic, comprising:
   identifying different types of traffic that may be received, wherein different transmission schedules are associated with the different types of traffic;
   selecting, from the different types of traffic that may be received, at least one type of traffic that is to be received and at least one type of traffic that is not to be received;
   receiving each type of traffic selected to be received by transitioning from a power save state to an active state according to a time interval defined by the transmission schedule associated with each type of traffic selected to be received; and
   not receiving each type of traffic selected not to be received by not transitioning from the power save state to the active state according to a time interval defined by the transmission schedule associated with each type of traffic selected not to be received.

2. The method of claim 1, wherein the method is performed in a wireless station operating in an 802.11 protocol based system.

3. The method of claim 1, wherein the time interval associated with each type of traffic selected to be received is a multiple of the time interval associated with each type of traffic selected not to be received.

4. The method of claim 1, wherein a user selects the at least one type of traffic that is to be received and the at least one type of traffic that is not to be received.

5. The method of claim 1, further comprising performing a learning operation based on analysis of the received traffic to automatically select the at least one type of traffic that is to be received and the at least one type of traffic that is not to be received.

6. The method of claim 1, further comprising associating with an access point to determine the different types of traffic and associated transmission schedules.

7. The method of claim 6, further comprising sending a query regarding availability of different types of traffic.

8. The method of claim 6, further comprising receiving beacons including indications of time intervals at which the different types of traffic are transmitted.

9. The method of claim 6, further comprising receiving beacons including an indication of an amount of time remaining before delivery of at least one of the different types of traffic.

10. The method of claim 1, wherein:
    each of the transmission schedules is associated with a time interval; and
    the time interval associated with at least one of the transmission schedules is a multiple of the time interval associated another one of the transmission schedules.

11. The method of claim 10, wherein:
    a first time interval associated with delivery of a first type of the different types of traffic is a multiple of a delivery traffic indication map (DTIM) interval; and
    a second time interval associated with delivery of a second type of the different types of traffic is longer than the first interval period and is a multiple of the DTIM interval.

12. The method of claim 1, further comprising receiving traffic classified into at least one of the different types of traffic based on at least one of the group consisting of: a protocol type, a source port, a destination port, a source address, a destination address, a type of service, a frequency of receipt of traffic, and identification of an application associated with traffic.

13. The method of claim 1, further comprising receiving traffic classified into at least one of the different types of traffic based on a traffic learning operation.

14. A method of receiving broadcast or multicast traffic, comprising:
receiving at least one of a plurality of different types of broadcast or multicast traffic, wherein the different types of traffic comprise control plane traffic and user plane traffic, and different transmission schedules are associated with the different types of traffic;
waking from a power save state to receive the control plane traffic and not waking from the power save state to thereby not receive the user plane traffic;
receiving a user plane traffic indication transmitted in a delivery traffic indication map at a first time interval;
receiving a control plane traffic indication transmitted in a management traffic indication map at a second time interval; and
receiving the control plane traffic at intervals corresponding to the second time interval, wherein the second time interval is longer than and a multiple of the first time interval.

15. The method of claim 14, wherein the control plane traffic relates to at least one of the group consisting of: connectivity, topology, path discovery, ARP, DHCP, presence, and paging.

16. The method of claim 14, wherein the user plane traffic comprises at least one of the group consisting of: streaming data, audio, and video.

17. An apparatus, comprising:
a receiver configured to receive at least one of a plurality of different types of broadcast or multicast traffic, wherein different transmission schedules are associated with the different types of traffic;
a scheduler configured to schedule reception of the at least one type of traffic in accordance with at least one associated transmission schedule;
an identifier configured to identify the different types of traffic that may be received;
a selector configured to select, from the different types of traffic that may be received, at least one type of traffic that is to be received and at least one type of traffic that is not to be received; and
a state controller configured to:
transition the receiver from a power save state to an active state according to a time interval defined by the transmission schedule associated with each type of traffic selected to be received; and
not transition the receiver from the power save state to the active state according to a time interval defined by the transmission schedule associated with each type of traffic selected not to be received.

18. The apparatus of claim 17, wherein the apparatus is a mobile station operative in an 802.11 protocol based system.

19. The apparatus of claim 17, wherein the time interval associated with each type of traffic selected to be received is a multiple of the time interval associated with each type of traffic selected not to be received.

20. The apparatus of claim 17, further comprising a user interface adapted to receive input from a user to select the at least one type of traffic that is to be received and the at least one type of traffic that is not to be received.

21. The apparatus of claim 17, further comprising a traffic analyzer adapted to perform a learning operation based on analysis of the received traffic to automatically select the at least one type of traffic that is to be received and the at least one type of traffic that is not to be received.

22. The apparatus of claim 17, further comprising a media access controller adapted to associate with an access point to determine the different types of traffic and associated transmission schedules.

23. The apparatus of claim 17, wherein:
each of the transmission schedules is associated with a time interval; and
the time interval associated with at least one of the transmission schedules is longer than and a multiple of the time interval associated another one of the transmission schedules.

24. An apparatus for receiving broadcast or multicast traffic, comprising:
means for receiving at least one of a plurality of different types of broadcast or multicast traffic, wherein different transmission schedules are associated with the different types of traffic;
means for scheduling reception of the at least one type of traffic in accordance with at least one associated transmission schedule;
means for identifying the different types of traffic that may be received;
means for selecting, from the different types of traffic that may be received, at least one type of traffic that is to be received and at least one type of traffic that is not to be received; and
means for transitioning the means for receiving from a power save state to an active state according to a time interval defined by the transmission schedule associated with each type of traffic selected to be received and not transitioning the means for receiving from the power save state to the active state according to a time interval defined by the transmission schedule associated with each type of traffic selected not to be received.

25. The apparatus of claim 24, wherein the apparatus is a wireless station operative in a 802.11 protocol based system.

26. The apparatus of claim 24, wherein the time interval associated with each type of traffic selected to be received is longer than and a multiple of the time interval associated with each type of traffic selected not to be received.

27. The apparatus of claim 24, further comprising means for performing a learning operation based on analysis of the received traffic to automatically select the at least one type of traffic that is to be received and the at least one type of traffic that is not to be received.

28. The apparatus of claim 24, wherein:
each of the transmission schedules is associated with a time interval; and
the time interval associated with at least one of the transmission schedules is longer than and a multiple of the time interval associated another one of the transmission schedules.

29. A non-transitory computer-readable medium including instructions stored thereon for causing a wireless station to:
identify different types of traffic that may be received: wherein different transmission schedules are associated with the different types of traffic;
select, from the different types of traffic that may be received, at least one type of traffic that is to be received mid at least one type of traffic that is not to be received;
receive each type of traffic selected to be received by transitioning from a power save state to an active state according to a time interval defined by the transmission schedule associated with each type of traffic selected to be received; and
not receive each type of traffic selected not to be received by not transitioning from the power save state to the active state according to a time interval defined by the transmission schedule associated with each type of traffic selected not to be received.

30. The non-transitory computer-readable medium of claim 29, wherein the wireless station is operative in an 802.11 protocol based system.

31. The non-transitory computer-readable medium of claim 30, wherein the time interval associated with each type of traffic selected to be received is a multiple of the time interval associated with each type of traffic selected not to be received.

32. The non-transitory computer-readable medium of claim 30, wherein the instructions further cause the wireless station to perform a learning operation based on analysis of the received traffic to automatically select the at least one type of traffic that is to be received and the at least one type of traffic that is not to be received.

33. The non-transitory computer-readable medium of claim 29, wherein: each of the transmission schedules is associated with a time interval; and the time interval associated with at least one of the transmission schedules is a multiple of the time interval associated another one of the transmission schedules.

34. A method of providing classified broadcast or multicast traffic, comprising:
receiving broadcast or multicast traffic;
classifying the received traffic into different types of traffic;
associating different transmission schedules with the different types of traffic; and
transmitting the different types of traffic at different time intervals having different periodicities;
wherein a delivery traffic indication map (DTIM) beacon is transmitted at a first periodicity, the DTIM beacon providing an indication as to whether a first type of multicast or broadcast traffic will follow the DTIM beacon; and a second beacon is transmitted at a second periodicity that is a multiple of the first periodicity, the second beacon providing an indication as to whether a second type of broadcast or multicast traffic will follow the second beacon.

35. The method of claim 34, further comprising transmitting beacons including indications of time intervals at which the different types of traffic are transmitted.

36. The method of claim 34, further comprising transmitting beacons including an indication of an amount of time remaining before delivery of at least one of the different types of traffic.

37. The method of claim 34, wherein the classifying is based on at least one of the group consisting of: a protocol type, a source port, a destination port, a source address, a destination address, a frequency of receipt of traffic, a type of service, and identification of an application associated with traffic.

38. The method of claim 34, wherein the classifying comprises performing a learning operation based on analysis of received traffic.

39. The method of claim 34, wherein the different types of traffic comprise user plane traffic and control plane traffic.

40. The method of claim 39, further comprising transmitting the control plane traffic according to a first time interval and transmitting the user plane traffic according to a second time interval, wherein the first time interval is a multiple of the second time interval.

41. The method of claim 39, further comprising:
sending a user plane traffic indication in a delivery traffic indication map (DTIM) beacon at a first time interval;
sending a control plane traffic indication in a management traffic indication map (MTIM) beacon at a second time interval; and
sending the control plane traffic at intervals corresponding to the second time interval and sending the user plane traffic at intervals corresponding to the first time interval, wherein the second time interval is a multiple of the first time interval.

42. The method of claim 39, wherein the control plane traffic relates to at least one of the group consisting of: connectivity, topology, path discovery, ARP, DHCP, presence, and paging.

43. The method of claim 39, wherein the user plane traffic comprises at least one of the group consisting of: streaming data, audio, and video.

44. An apparatus comprising:
a receiver configured to receive broadcast or multicast traffic;
a classifier configured to classify the received traffic into different types of traffic;
a scheduler configured to associate different transmission schedules with the different types of traffic; and
a transmitter configured to transmit the different types of traffic at different intervals having different periodicities;
wherein a delivery traffic indication map (DTIM) beacon is transmitted at a first periodicity, the DTIM beacon providing an indication as to whether a first type of multicast or broadcast traffic will follow the DTIM beacon; and a second beacon is transmitted at a second periodicity that is a multiple of the first periodicity, the second beacon providing an indication as to whether a second type of broadcast or multicast traffic will follow the second beacon.

45. The apparatus of claim 44, wherein the transmitter is further adapted to transmit beacons including:
indications of time intervals at which the different types of traffic are transmitted; and
an indication of an amount of time remaining before delivery of at least one of the different types of traffic.

46. The apparatus of claim 44, wherein the classifier is further adapted to classify the received traffic based on at least one of the group consisting of: a protocol type, a source port, a destination port, a source address, a destination address, a frequency of receipt of traffic, a type of service, and identification of an application associated with traffic.

47. The apparatus of claim 44, wherein the classifier is further adapted to classify the received traffic by performing a learning operation based on analysis of received traffic.

48. The apparatus of claim 44, wherein the different types of traffic comprise user plane traffic and control plane traffic.

49. The apparatus of claim 48, wherein the transmitter transmits the control plane traffic according to a first time interval and the user plane traffic according to a second time interval, wherein the first time interval is a multiple of the second time interval.

50. The apparatus of claim 48, wherein the control plane traffic relates to at least one of the group consisting of: connectivity, topology, path discovery, ARP, DHCP, presence, and paging, and the user plane traffic comprises at least one of the group consisting of: streaming data, audio, and video.

51. An apparatus comprising:
means for receiving broadcast or multicast traffic;
means for classifying the received traffic into different types of traffic; and
means for associating different transmission schedules with the different types of traffic; and means for transmitting the different types of traffic at different intervals having different periodicities;
wherein a delivery traffic indication map (DTIM) beacon is transmitted at a first periodicity, the DTIM beacon providing an indication as to whether a first type of multicast or broadcast traffic will follow the DTIM beacon; and a second beacon is transmitted at a second periodicity that is a multiple of the first periodicity, the second beacon providing an indication as to whether a second type of broadcast or multicast traffic will follow the second beacon.

52. The apparatus of claim 51, wherein the means for transmitting further transmits beacons including:
indications of time intervals at which the different types of traffic are transmitted; and
an indication of an amount of time remaining before delivery of at least one of the different types of traffic.

53. The apparatus of claim 51, wherein the means for classifying further classifies the received traffic based on at least one of the group consisting of: a protocol type, a source port, a destination port, a source address, a destination address, a frequency of receipt of traffic, a type of service, and identification of an application associated with traffic.

54. The apparatus of claim 51, wherein the means for classifying further classifies the received traffic by performing a learning operation based on analysis of received traffic.

55. The apparatus of claim 51, wherein the different types of traffic comprise user plane traffic and control plane traffic.

56. The apparatus of claim 55, further comprising means for transmitting the control plane traffic according to a first time interval and the user plane traffic according to a second time interval, wherein the first time interval is a multiple of the second time interval.

57. The apparatus of claim 55, wherein:
the control plane traffic relates to at least one of the group consisting of: connectivity, topology, path discovery, ARP, DHCP, presence, and paging; and
the user plane traffic comprises at least one of the group consisting of: streaming data, audio, and video.

58. The non-transitory computer-readable medium including instructions stored thereon for causing an access point to:
receive broadcast or multicast traffic: classify the received traffic into different types of traffic;
associate different transmission schedules with the different types of traffic;
transmit the different types of traffic at different intervals having different periodicities; and
cause the access point to transmit a deliver3, traffic indication map (DTIM) beacon at a first periodicity, the DTIM beacon providing an indication as to whether a first type of multicast or broadcast traffic will follow the DTIM beacon; and to transmit a second beacon at a second periodicity that is a multiple of the first periodicity, the second beacon providing an indication as to whether a second type of broadcast or multicast traffic will follow the second beacon.

59. The non-transitory computer readable medium of claim 58, wherein the instructions further cause the access point to transmit beacons including:
indications of time intervals at which the different types of traffic are transmitted; and an indication of an amount of time remaining before delivery of at least one of the different types of traffic.

60. A non-transitory computer-readable medium including instructions stored thereon for causing an access point to:
receive broadcast or multicast traffic:
classify the received traffic into different types of traffic, wherein the different types of traffic comprise user plane traffic and control plane traffic;
associate different transmission schedules with the different types of traffic;
transmit the different types of traffic at different intervals having different periodicities; and
further cause the access point to transmit the control plane traffic according to a first time interval and the user plane traffic according to a second time interval, wherein the first time interval is a multiple of the second time interval.

61. The non-transitory computer-readable medium of claim 60, wherein: the control plane traffic relates to at least one of the group consisting of: connectivity, topology, path discovery, ARP, DHCP, presence, and paging; and the user plane traffic comprises at least one of the group consisting of: streaming data, audio, and video.

* * * * *